United States Patent

[11] 3,563,616

| [72] | Inventor | Ernest Leonard Allen<br>Dunstable, England |
|---|---|---|
| [21] | Appl. No. | 789,523 |
| [22] | Filed | Jan. 7, 1969 |
| [45] | Patented | Feb. 16, 1971 |
| [73] | Assignee | Rotax Limited<br>London, England |
| [32] | Priority | Jan. 22, 1968 |
| [33] | | Great Britain |
| [31] | | 3221/68 |

[54] LINEAR MOTION BEARINGS
2 Claims, 3 Drawing Figs.

[52] U.S. Cl. .................................................... 308/6
[51] Int. Cl. ............................................... F16c 29/06
[50] Field of Search ........................................... 308/6C;
64/23

[56] References Cited
UNITED STATES PATENTS
| 2,620,163 | 12/1952 | Stone ........................... | 64/23 |
| 2,945,366 | 7/1960 | Sears ............................ | 308/6C |

*Primary Examiner*—Fred C. Mattern, Jr.
*Assistant Examiner*—Frank Susko
*Attorney*—Holman, Glascock, Downing & Seebold

ABSTRACT: A linear motion ball bearing comprising a pair of telescopic members, the member having grooves which in association with grooves formed on the member, define tracks for ball bearings under load, there being formed in the member recesses which permit the return movement of the balls, there being provided a pair of end plates having channel portions which guide the balls between the ends of the tracks and the adjacent ends of the recesses.

PATENTED FEB 16 1971   3,563,616

INVENTOR
Ernest Leonard Allen
BY Holman, Glascock
Downing & Seebold
ATTORNEYS

LINEAR MOTION BEARINGS

This invention relates to linear motion ball bearings of the kind comprising a pair of telescopic members, one of said members having a plurality of axial grooves thereon, the other of said members also having a plurality of grooves thereon and in registration respectively with the grooves on said one member, each pair of aligned grooves defining a ball track in which is accommodated a plurality of load-bearing balls, and return means for allowing the balls to travel between the ends of said tracks respectively as the members are moved telescopically.

The object of the invention is to provide such a bearing in a simple and convenient form.

According to the invention in a bearing of the kind specified each of said ball return means comprises in part, passage means defined by an elongated recess in one of the members intermediate a pair of adjacent grooves thereon, means for conducting the balls from the ends of an adjacent groove on said one member to the ends respectively of said recess, said recess being of such a size as to permit free movement of the balls there along during telescopic motion of the members and the balls being retained in said recess by a complementary portion on the other member.

Figure 1:
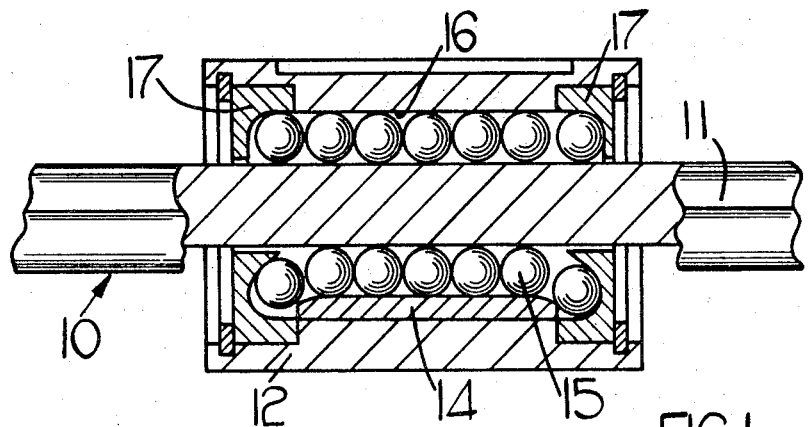
FIG. 1 is a sectional side elevation of one example of a bearing in accordance with the invention.
Figure 2:
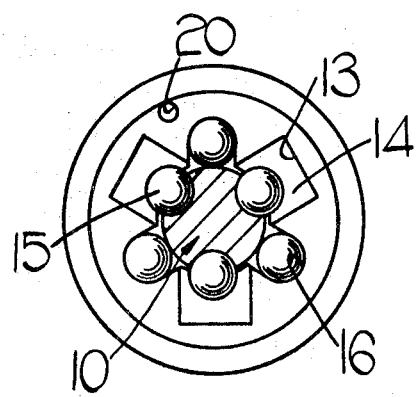
FIG. 2 is an end view of the bearing shown in FIG. 1 with parts removed for the sake of clarity.
Figure 3:
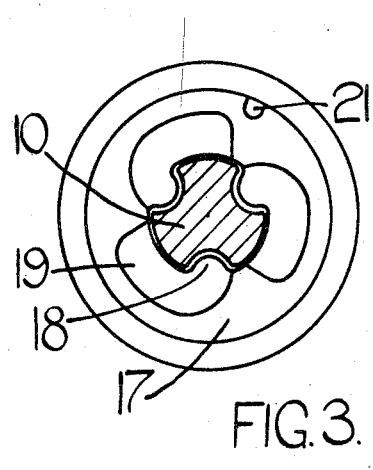
FIG. 3 is an end view of one of the parts removed in FIG. 2.

In one example of a linear motion ball bearing in accordance with the invention there is provided a cylindrical member 10 having formed on its periphery, three equiangularly spaced splines which define therebetween three equiangularly spaced hemispherical grooves 11. Also provided is a hollow cylindrical member 12 through which the cylindrical member 10 passes and which on its internal periphery, is provided with three equiangularly spaced and axially extending slots 13.

The aforementioned slots accommodate inserts 14 respectively and in the faces thereof which are presented to the cylindrical member 10 are formed part spherical grooves respectively.

The two members 10, 12 are oriented in such a manner that the grooves on the members are disposed opposite each other and each pair of grooves defines a ball track in each of which is located a plurality of load-bearing balls 15 and the arrangement is such that as the members are moved telescopically with respect to each other the balls will slide within the tracks thereby defining a linear bearing which in addition can transmit rotary motion.

Disposed intermediate the slots 13 respectively, in the outer cylindrical member 12 is a plurality of axially extending recesses 16, each of which forms part of a return means for allowing the balls which are ejected from the end of one track to return to the other end of the same track. The recesses are so shaped as to permit free unloaded movement of the balls therein and the cylindrical surfaces of the spline portions of the cylindrical member 10 act to retain the balls in the recesses.

Located at the opposite ends of the hollow cylindrical member 21 are a pair of end plates 17 respectively which are retained relative to the hollow cylindrical member by means of circlips or any other suitable means. The end plates are of generally annular form and formed within their inner end faces are return channels 19 which direct the balls either to or from one end of a track to the adjacent end of a recess. At the end track end of each return channel the plate is provided with a scoop portion 18 which extends into the groove 11 of the member 10. In this manner as the members are moved telescopically relative to each other the balls which carry the load whilst they are situated within the tracks are ejected from the ends of the tracks at one end of the hollow cylindrical member and are returned to the ends of the tracks at the other end of the hollow cylindrical member. It will be appreciated that the inserts may be omitted and the grooves thereon machined directly onto the internal peripheral surface of the outer cylindrical member. The plates 17 are retained against angular movement by means of pins 20 secured to the member 12 and which engage with cut out portions 21 formed in the plates.

I claim:

1. A linear motion ball bearing comprising in combination an elongated inner member and an annular outer member surrounding the inner member, a plurality of axially extending grooves formed on the inner member, a plurality of axially extending slots formed in the outer member, the number of slots being equal to the number of grooves, a plurality of inserts disposed in the slots respectively, a groove defined in the face of each insert facing the inner member, the grooves on the inserts and the inner member-defining ball tracks, as a set of balls disposed in each track, a plurality of recesses formed in the outer member intermediate the slots respectively, said recesses being of gap sufficient to accommodate the balls, a pair of end plates disposed at the opposite ends of the outer member and a plurality of channels formed in the inner face of each end plate, the channels in one plate acting to divert balls ejected from the tracks into the return channels defined by the recesses and the channels in the other plate acting to divert the balls ejected from the return channels into the tracks.

2. A linear motion bearing as claimed in claim 1 including scoop portions defined by said end plates and which depend into the grooves of the inner member, said scoop portions acting to guide the movement of the balls leaving the tracks into the channels formed in the end plates.